United States Patent
Baier

(10) Patent No.: US 8,423,184 B2
(45) Date of Patent: Apr. 16, 2013

(54) DEVICE AND METHOD FOR DETECTING AND NEUTRALIZING HAZARDOUS GOODS

(75) Inventor: Gunar Baier, Manheim (DE)

(73) Assignee: Grenzebach Maschinenbau GmbH, Asbach-Baumenheim (DE)

( * ) Notice: Subject to any disclaimer, the term of this patent is extended or adjusted under 35 U.S.C. 154(b) by 469 days.

(21) Appl. No.: 12/681,844

(22) PCT Filed: Oct. 6, 2008

(86) PCT No.: PCT/DE2008/001651
§ 371 (c)(1),
(2), (4) Date: Apr. 6, 2010

(87) PCT Pub. No.: WO2009/046703
PCT Pub. Date: Apr. 16, 2009

(65) Prior Publication Data
US 2010/0234989 A1    Sep. 16, 2010

(30) Foreign Application Priority Data
Oct. 12, 2007 (DE) .......................... 10 2007 048 968

(51) Int. Cl.
*G06F 19/00* (2011.01)
*G05B 15/00* (2006.01)

(52) U.S. Cl.
USPC .................................. 700/245; 700/1; 700/83

(58) Field of Classification Search .......................... None
See application file for complete search history.

(56) References Cited

U.S. PATENT DOCUMENTS

| 3,695,462 A * | 10/1972 | Sullivan ........................ 414/273 |
| 4,668,146 A * | 5/1987 | Ageta ................................ 414/4 |
| 5,497,674 A * | 3/1996 | Inada ......................... 74/490.03 |
| 5,640,464 A * | 6/1997 | Ebel et al. ...................... 382/143 |
| 5,943,436 A * | 8/1999 | Ebel et al. ...................... 382/143 |
| 5,967,739 A * | 10/1999 | Bennison .................... 414/744.3 |
| 6,361,265 B1 * | 3/2002 | Mahoney ...................... 414/497 |
| 6,580,046 B1 * | 6/2003 | Koini et al. .................... 209/564 |
| 6,584,170 B2 | 6/2003 | Aust et al. |
| 6,597,760 B2 | 7/2003 | Beneke et al. |

(Continued)

FOREIGN PATENT DOCUMENTS

| DE | 9104673 | 8/1991 |
| DE | 10125531 | 11/2002 |
| DE | 102005002756 | 7/2006 |
| DE | 202007015169 | 10/2007 |
| DE | 202007014339 | 2/2008 |
| GR | 1003895 | 5/2002 |

*Primary Examiner* — Ian Jen
(74) *Attorney, Agent, or Firm* — Duane Morris LLP; J. Rodman Steele, Jr.; Gregory M. Lefkowitz

(57) ABSTRACT

The invention relates to a method and a device for detecting and safely neutralizing hazardous goods to be selected from a quantity of non-hazardous goods, having the following characteristics: a) the consecutively delivered quantity of goods to be analyzed is examined for abnormalities in a sequence of control stations (9, 10, 11, 12), b) the respectively selected goods are delivered from one control station to the next by way of a gripper device controlled by at least one multiaxle robot (7, 8), c) the gripper device controlled by the at least one multiaxle robot (7, 8) is used to shift the goods in a control station (9, 10, 11, 12), d) the gripper device attached to the multiaxle robot (7, 8) has an activatable emission protection (13) for hazard potential emitting from the respective good, and a computer program and machine-readable carrier with the program code thereof.

20 Claims, 4 Drawing Sheets

U.S. PATENT DOCUMENTS

| | | |
|---|---|---|
| 6,629,594 B2 * | 10/2003 | Nagel et al. ............... 198/468.6 |
| 7,381,962 B2 | 6/2008 | Goldberg |
| 7,753,191 B2 * | 7/2010 | Lykkegaard et al. ......... 198/401 |
| 2002/0020607 A1 * | 2/2002 | Nagel et al. .................. 198/610 |
| 2003/0031293 A1 | 2/2003 | Aust et al. |
| 2007/0102646 A1 | 5/2007 | Goldberg |
| 2007/0235658 A1 * | 10/2007 | Zimdars et al. ......... 250/390.07 |
| 2008/0083661 A1 | 4/2008 | Henkel |

* cited by examiner

DEVICE AND METHOD FOR DETECTING AND NEUTRALIZING HAZARDOUS GOODS

CROSS-REFERENCE TO RELATED APPLICATIONS

This application is a §371 national stage entry of International Application No. PCT/DE2008/001651, filed Oct. 6, 2008, which claims priority to German Patent Application No. 10 2007 048 968.6, filed Oct. 12, 2007, both of which are hereby incorporated by reference.

BACKGROUND

Since the attacks on Sep. 11, 2001, the entire security infrastructure for air transport has been trained to prevent explosives, weapons or objects similar to weapons from being carried on board. Nevertheless, according to information from the pilot's union. Cockpit, the luggage problem has become even worse. There is said to be an actual trend toward business travelers transporting hazardous goods. This is because, on the one hand, there are scientists who fly to a congress with toxicological samples in their luggage, and on the other hand there are marketing people who travel to an exhibition with 400 gas lighters, or fitters and installation specialists who are traveling with hazardous special tools to carry out repairs for customers. Two particularly serious aircraft accidents have already been caused by hazardous goods on board. The crash by a DC-9 belonging to the US budget airline ValuJet in May 1996 (110 deaths) and the fire on a pilgrim flight in a Lockheed TriStar in Saudi Arabia in 1980 (301 deaths). In the opinion of specialists, accidents such as these can occur again at any time, particularly in the case of so-called Hadj pilgrim flights during which, as before, it is standard practice to carry gas ovens on board as hand luggage.

The primary interest with regard to on-board luggage is to detect weapons or objects similar to weapons, as well as substances and items which represent a potential hazard when used by a passenger. In the case of the luggage that is carried in the aircraft fuselage, the primary factor is to detect explosives which, for example, could be detonated by time fuzes or remote fuzing. It is also important to identify the devices required to detonate the explosive materials. Widely differing methods for identification of such substances have already been introduced, such as X-ray installations, tomographs, etc. for automatic or semi-automatic checking. Particularly at relatively large airports, the normal practice in this case is to first of all automatically check all luggage items. Luggage items which are classified as being critical in this first check are than subjected to further checks which can then, for example, also include a manual check by security personnel opening the luggage item.

If it is found that a luggage item contains explosive material, this luggage item is isolated and, for example, is taken to explosive chambers or explosive containers, and is deliberately destroyed.

Apparatuses or methods which contribute to the precautions against such hazards have been known for a very long time for the patent literature.

By way of example, DE 101 25 531 A1 discloses an inspection installation for inspection of objects, in particular for identification of impermissible objects in travel luggage items, having beam sources with detector rows aligned with them, which are arranged around a transport shaft, in which the beam sources produce at least three beams which are applied to the object from at least three beam levels.

In this case, it is considered to be novel and inventive that the inspection installation is included in a housing of a separate device, or vice versa, and that, in order to lengthen a beam tunnel, the inspection installation has a shield, which interacts with the transport shaft, before the transport shaft, or is fitted around an installation part which belongs to the separate device (claim 1).

In the case of this installation, only in this specific case is there an aim to reduce the space requirement and therefore to obtain an improved capability for retrofitting.

In the case of the method known from DE 101 39 672 A1, the aim is to specify improved checking for the inspection of an object, in particular of a luggage item, in which beams are emitted from a fixed-position beam source, the object is transported in a straight line through the beams and, in the process, the intensity of the beams which have not been absorbed is detected by a detector arrangement and is processed to form an image of the object, this is achieved in that, after passing through the beams that are used, the object is rotated by a rotation device through an angle in order to change its transport position, is once again transported through the beams, and a further image is produced in this case (claim 1).

The magnitude and/or the direction of the rotation angle are/is in this case entered manually by an operator.

The respective luggage item is in this case moved by means of a transport device which provides straight-line conveyance. No high-speed transport capability, bypassing the normal conveyor belts, is possible in this case.

Furthermore, for relatively new developments in the security sector, DE 11 2004 002 474 T5 discloses a method for detection of small amounts of specific nuclear materials which are transported impermissibly in cargo. Substances such as these may, for example, be used to produced improvised nuclear devices (INDs). Very-high-priority research programs are currently being carried out in order to counter such hazards, initiated by the US Dept. of Homeland Security, DHS. In general, this does not address the transport of high-risk luggage.

In addition, for example, DE 11 2004 002 474 T5 describes the already developed security screening methods and apparatuses in the prior art, taking account of the latest developments and potential hazards identified so far.

Specifically in this context DE 11 2004 002 474 T5 cites passive radiation monitoring systems and single-energy radiography systems, as well as dual-energy radiography (DER) systems.

The method disclosed here is based on the object of allowing a screening method for effective prevention of impermissible transport of SNMs (specific nuclear materials) at the critical entry and exit monitoring points by the detection of even small amounts of SNMs in freight items.

The method described here consists in carrying out multi-view-multi-energy radiography by irradiation of an object with a plurality of discrete high-energy gamma beams, based on nuclear reactions, in a plurality of different orientations, detection and recording of the radiation which passes through the object, by means of at least one detector arrangement.

Furthermore, the method described here consists in the indication of the presence of a high-Z substance by detection of a difference in a transmission-attenuation characteristic of the high-Z substance in contrast to low-Z and medium-Z substances (claim 1).

It is evident from the described prior art that technology for detection of hazardous substances must continuously be adapted to new potential hazards.

This requires the use of novel detection methods and new development of appropriate monitoring stations. However, since newly developed monitoring stations must be associated with the existing monitoring capabilities and must be included in the luggage transport process and luggage handling process, it is necessary to create faster and more effective transport and distribution capabilities for the recording and passing on of luggage which has already been identified during the initial check as being conspicuous.

SUMMARY OF THE INVENTION

The apparatus according to the invention and the corresponding method are therefore based on the object of providing a measure for detection, for segregation and for neutralization of hazardous transport items, which measure can easily be integrated in existing systems, allows fast and safe transport of such a hazardous item, and occupies only a small amount of space.

This object can be achieved by the apparatuses as claimed in claim 1 and by the method as claimed in claim 5.

BRIEF DESCRIPTION OF THE DRAWINGS

The apparatus according to the invention and the method on which it is based will be described in more detail with reference to FIGS. 1 to 4.

In detail.

DETAILED DESCRIPTION

Nowadays, luggage is very often conveyed over medium and long distances by air traffic. In most airports, the flight luggage is delivered to the flight passenger via conveyor belts after having been conveyed by land-based transport vehicles.

While being carried by the appropriate transport systems and conveyor belts within the airport area, the flight luggage is also subjected to more or less extensive security examinations, with each luggage item handed in at the check-in desk by a passenger having to be checked in accordance with the legal regulations. The security check consists in the flight luggage, which is transported in a serial form on a transport apparatus, generally a conveyor belt, being subjected to individual monitoring, generally to a radiological examination.

If a conspicuous feature is found in any way during this initial check of one of the transported luggage items, it is immediately segregated and is generally subjected, via a further conveyor belt, to a further, different or more detailed check. If this second check finds that the relevant luggage item can be classified as being safe, it is passed on for normal further conveyance again. Depending on the security requirements, the luggage items pass through a plurality of such security checks, in which case the checks can be carried out completely automatically, semi-automatically or manually.

At some airports, all the flight luggage is checked in this way only by the jointly used installations, while at other airports each airline company itself has to ensure a corresponding check. The conveyor installations required to transport the luggage items between the individual monitoring stations require a large amount of space. In this case, it is necessary to consider not only the linearly running conveyor belts with their edge boundaries of greater or less width for personnel protection, but also the numerous direction changes. Since large-area curve radii must be planned in order to ensure that luggage items are transported without damaging them, or height changes may be achieved only with shallow gradient angles and slight dissents, this results in installations such as these requiring a considerable area. Since the majority of luggage items are normally classified just after the first security check as being "safe", only a small proportion of the luggage items passes through the further monitoring stages, as a result of which, despite the large area that they require, the transport installations are used only to a minor extent. Furthermore, the mechanical load on the luggage items examined additionally rises with the length of the transport paths.

In the case of the apparatus according to the invention and the method according to the invention, the feed and sorting processes of luggage that has been identified as being conspicuous to the monitoring stations is carried out in a small area.

Figure 1:
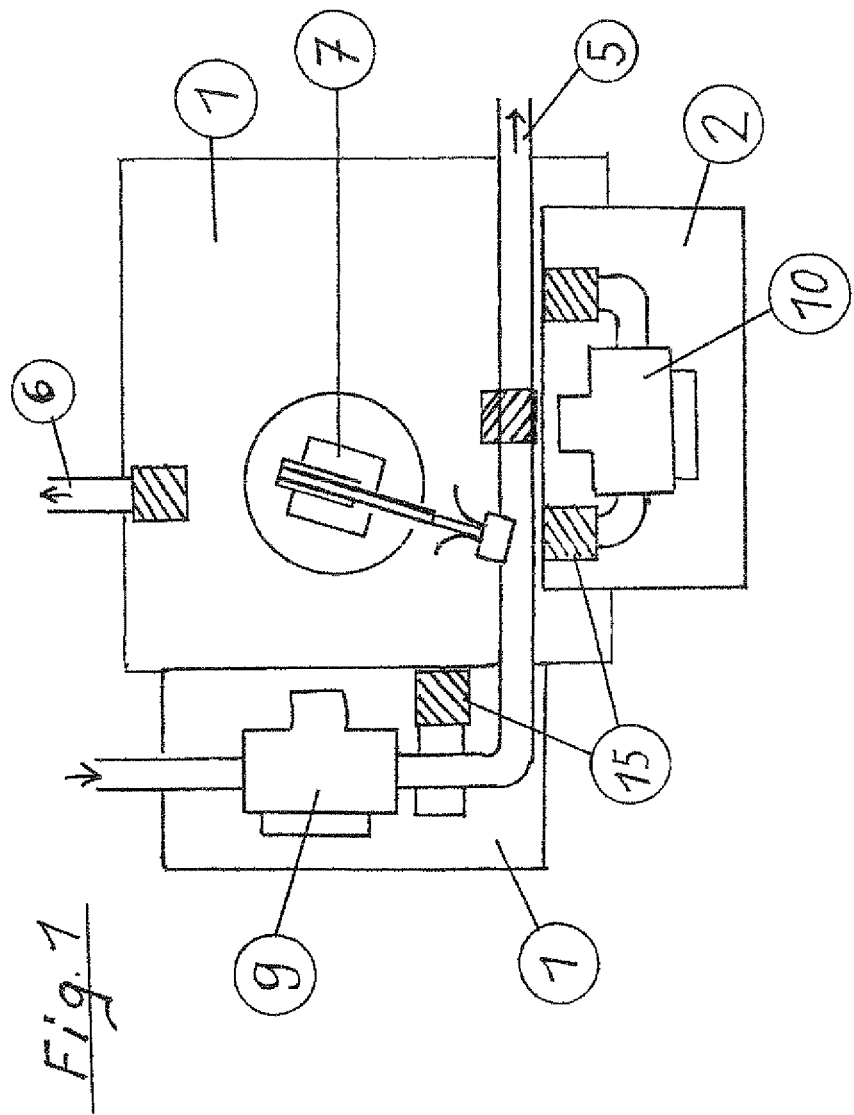
FIG. 1 shows a layout of 2 monitoring stations

By way of example, in the illustration shown in FIG. 1, the first monitoring unit (9) is associated with the first device level (1) and the luggage stream to be examined approaches this first monitoring unit (9) from the direction of the arrow at the top on the left. If a luggage item is detected in this monitoring unit (9) as being conspicuous, it is lifted by a first robot (7) by the shortest and fastest route to the second level (2), and is fed to the second monitoring unit (10). A robot such as this is generally a multi-axis gripping robot with a specific gripping apparatus for luggage items. The inconspicuous normal baggage is passed to the outlet (5) on the indicated route. If a corresponding luggage item is declared to be safe in the second monitoring unit (10), the robot (7) feeds it to the outlet (5). The areas (15) shaded in FIG. 1 in this case schematically indicate the holding areas for the transfer of luggage items which are intended to be conveyed further by the first robot (7).

In the event of a hazard, the luggage is moved by the first robot (7) on the shortest and fastest route to the outlet (6) for risk baggage. In this two-stage process of two monitoring units (9, 10) following one another in series, it is not important whether the first level (1) is located above or below the second level (2). The only important factor is that the robot (7) has free and unimpeded access to both levels.

Figure 2:
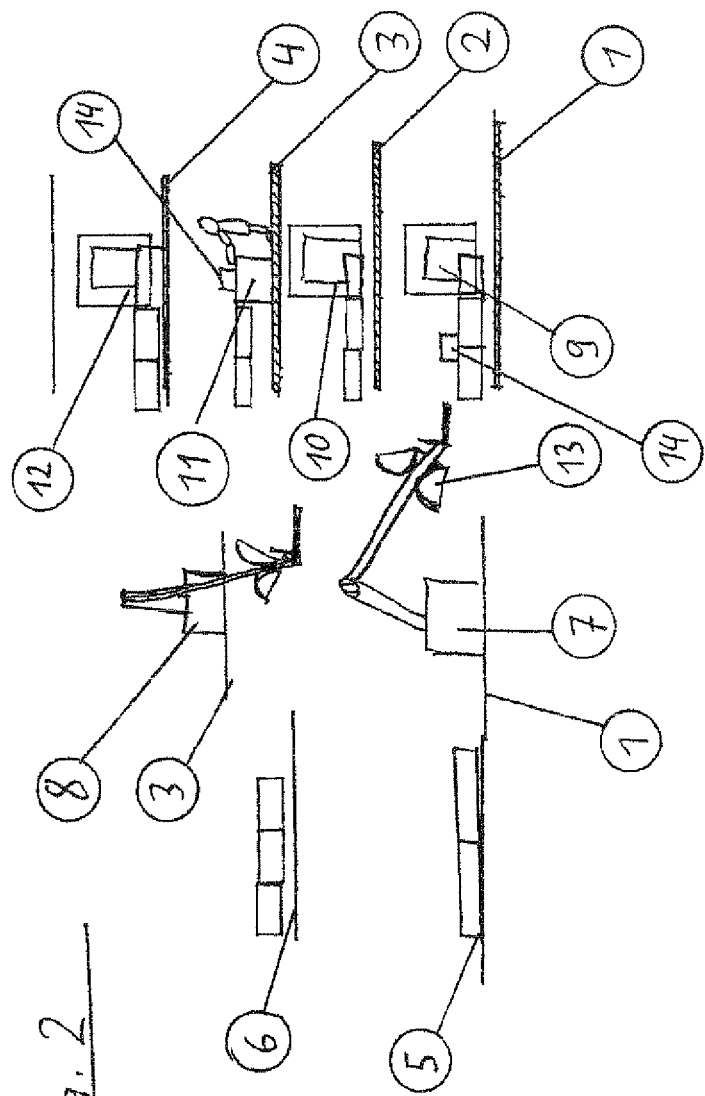
FIG. 2 shows the basic configuration of a unit with 4 monitoring stations

FIG. 2 illustrates the apparatus according to the invention using the example of a four-stage process, which in principle allows four monitoring units (9, 10, 11, 12) to follow one another in series.

In this case, four possible monitoring units (9, 10, 11, 12) on the four device levels (1, 2, 3, 4) are sketched on the right-hand side. In order to access the first robot (7) for access to the further device levels (11, 12), a further robot (8) is provided, with essentially the same equipment as the robot (7). In this case, for systematic reasons, the robot (8) is illustrated on the third level (3). However, with an appropriate configuration, it is also possible for one robot to have access to all four levels, for example by arranging the monitoring units in the form of a star on two levels.

By way of example, the third level (3) is illustrated in FIG. 2 as a level on which the luggage (14) is checked purely manually. In the illustrated example, a monitoring unit with a further, high-resolution examination method is shown on the fourth level (4), as the final monitoring capability for this illustrated process.

The outlet (5) for normal luggage and the outlet (6) for risk luggage corresponds to the illustration in FIG. 1.

Figure 4:
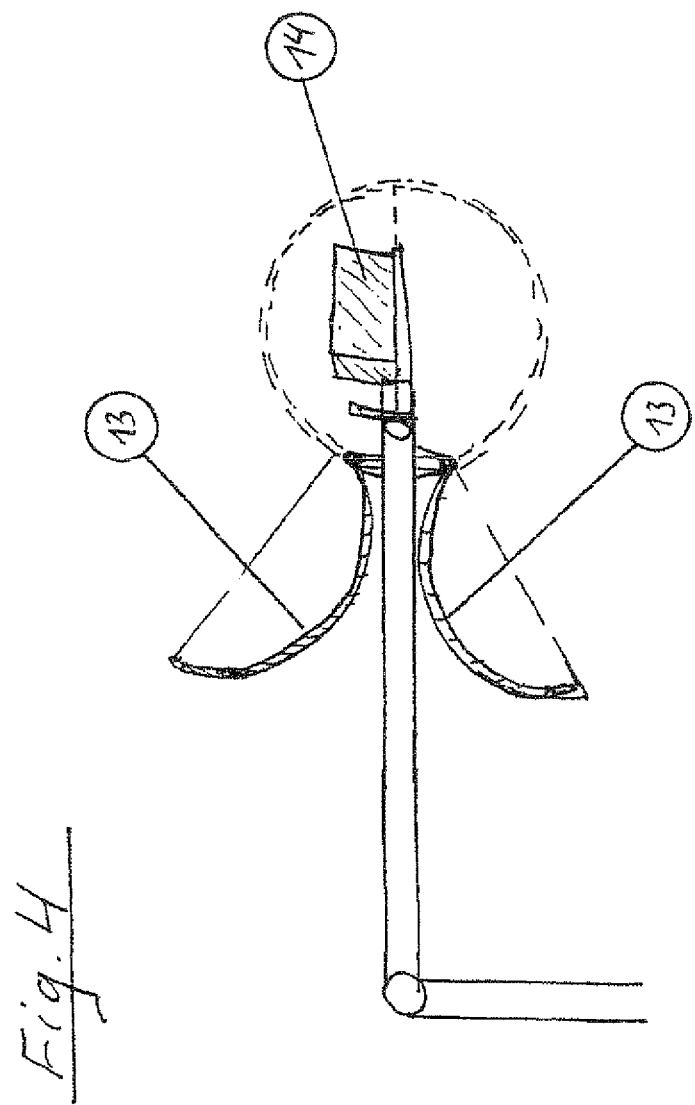
FIG. 4 shows an outline illustration of one specific gripping apparatus.

(13) in FIG. 2 denotes emission protection, which is fitted to the grippers of the two robots (7, 8) and is described in more detail in FIG. 4.

Figure 3:
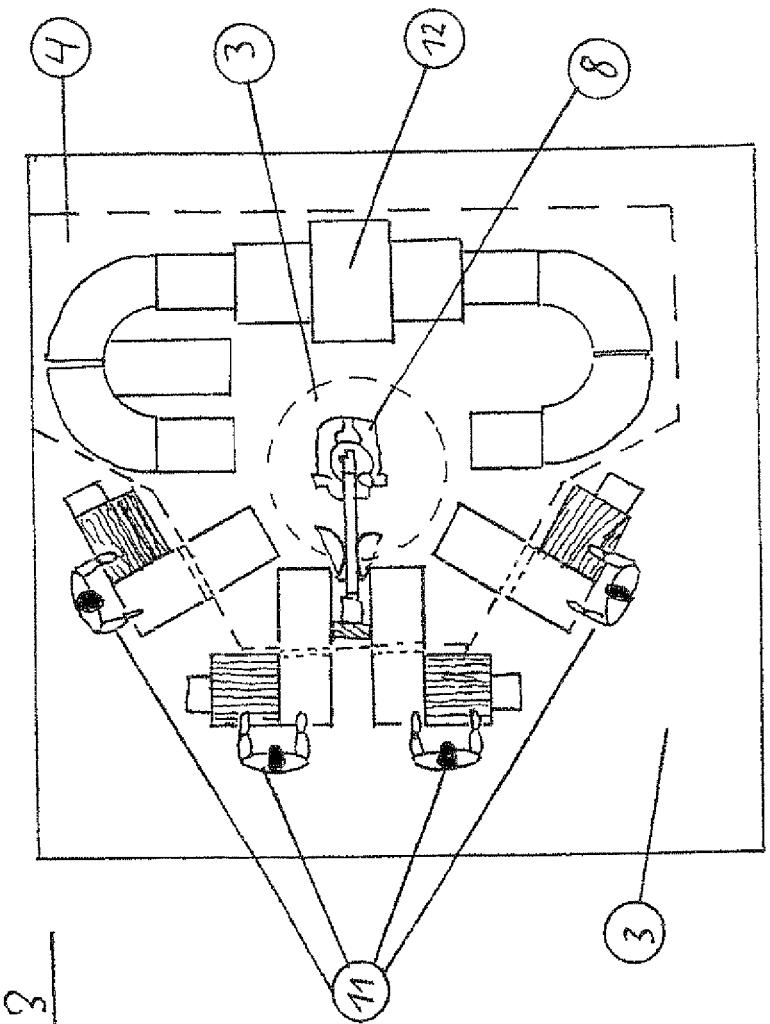
FIG. 3 shows the configuration of 2 higher-quality monitoring stations

FIG. 3 shows the configuration of two higher-quality monitoring stations. In this case, special employees are sketched at (11) at their respective workstation on the third level (3), and may each in their own way carry out a specific type of examination or check on the respective baggage item passed to them by a robot. In this case, each of these employees can be supplied via the second robot (8) with a luggage item from the fourth monitoring unit (12) on the fourth level (4), or this can be moved from this station to the employee's specific workstation, for further examination.

The robot (8) can also be used to rotate a respective luggage item (14) to be examined in the fourth monitoring unit (12) or to change its position corresponding to an input keyboard such that the respective employee (11) on the third level (3) can see the desired view of the luggage item to be examined, on his screen.

The fourth monitoring station (12), for example, is an increased resolution X-ray installation.

The illustration of a specific gripping apparatus shown in FIG. 4 relates to the situation in which the examination of a luggage item (14) leads to the expectation that this luggage item represents an acute hazard.

This hazard may consist in that the luggage item (14), for example, contains a component from which hazardous radiation is originating, or in that there is a risk of hazardous bacteria or viruses being emitted.

In these or other cases where an acute hazard to people is identified, the relevant luggage item is, for example, fed to an explosion chamber, for immediate destruction.

The apparatus according to the invention has been particularly proven for this situation since the respective robot ensures that the identified hazardous item is fed on for safe destruction by the shortest route, without having to be touched by anyone's hand. The emission protection (13) is used to ensure in situations such as this that the possible hazard to people is reduced even when a hazardous luggage item such as this is on its way to destruction. In the simplest case, this emission protection (13) comprises two hemispherical shells which can be folded together and are composed of emission-resistant material, separating the respective luggage item (14) from the outside world as far as possible. The two components of the emission protection (13) are in this case matched to the gripping arm of the robot such that the required gripping tasks are not adversely affected when the luggage items (14) are gripped. This can be done, for example, by appropriate cutouts, or space-consuming extensions, in the surface of the illustrated hemispheres.

In this case, for defense against virulent bacteria or viruses, it is sufficient to provide a flexible rubber-like surface, in which case only the connecting surface between two halves of the emission protection (13) need be specially configured.

An appropriate radiation-repelling material must be used to constrain radiation.

When explosions occur, at least a certain amount of fragment protection is ensured.

Different types of emission protection measures, which are particularly suitable for the respective application, can be applied to the gripping apparatus of a robot by appropriate adaptive measures that are known to a person skilled in the art. This can also be done automatically, with different types of emission protection apparatuses being kept available in a reservoir.

The robots that are used are preferably controlled by an employee at a workstation with manual control in the area of monitoring unit 3, wherein, when a plurality of such workstations are present and/or a plurality of robots (7, 8), each of these employees must be provided with the necessary information about the tasks and activities of the respective other employees involved in these control prerequisites. The monitoring unit associated with the robot system coordinates the movement of the individual luggage items and the actioning of the commands given by the employees. For this purpose, display systems are provided at the employee workstations, displaying the process status during transport of the luggage items from and to the monitoring stations.

If required, information relating to the results of the examination of the luggage items by the monitoring stations can also be displayed here.

The complexity of the equipment required in practice is governed firstly by the complexity for the checks that are considered to be necessary, and the number and the equipment of the individual monitoring stations, and on the other hand by the number of luggage items that can be expected to be assessed as hazardous.

The interactive control of the respectively used robot (7, 8) requires a specific control program.

LIST OF REFERENCE SYMBOLS (1) Device—level 1
(2) Device—level 2
(3) Device—level 3
(4) Device—level 4
(5) Outlet for normal luggage
(6) Outlet for risk luggage
(7) Multi-axis robot 1
(8) Multi-axis robot 2
(9) Monitoring unit 1
(10) Monitoring unit 2
(11) Monitoring unit 3 (manual)
(12) Monitoring unit 4 (high-resolution display)
(13) Emission protection
(14) Luggage item
(15) Transfer station

The invention claimed is:

1. An apparatus for detection and safe neutralization of hazardous goods, which can be selected from a set of safe goods, comprising:
   a) a sequence of monitoring stations (9, 10, 11, 12),
   b) at least one multi-axis robot (7, 8) having, a controlled gripping apparatus, and
   c) emission protection (13) fitted to the gripping apparatus, which is attached to a multi-axis robot (7, 8) said emission protection moving between a retracted position where the gripping apparatus can move goods between or within monitoring stations, and a closed position where the emission protection (13) confines goods supported by said gripping apparatus within closed volume.

2. The apparatus as claimed in claim 1, wherein the monitoring stations (9, 10, 11, 12) are in a compact and/or modular form.

3. The apparatus as claimed in claim 1, wherein various types of emission protection (13) can be selected from an accessible magazine.

4. The apparatus as claimed in claim 1, wherein the hazardous goods are luggage items.

5. A method for detection and safe neutralization of hazardous goods, which can be selected from a set of safe goods, comprising:

a) the set, which occurs in sequence, of goods to be examined is examined for conspicuous features in a sequence of monitoring stations (9, 10, 11, 12),
b) the conveyance of the respectively selected goods from one monitoring station to the next is carried out by means of a gripping apparatus, which is controlled by at least one multi-axis robot (7, 8),
c) the gripping apparatus, which is controlled by the at least one multi-axis robot (7, 8), is used to move the goods within a monitoring station (9, 10, 11, 12),
d) emission protection (13) fitted to the gripping apparatus, which is attached to the multi-axis robot (7, 8) has emission protection (13), said emission protection moving between a retracted position where the gripping apparatus can move goods between or within monitoring stations, and a closed position where the emission protection (13) confines goods supported by said gripping apparatus within a closed volume.

6. The method as claimed in claim 5, wherein the monitoring stations (9, 10, 11, 12) are arranged on a device level.

7. The method as claimed in claim 5, wherein the monitoring stations (9, 10, 11, 17) are arranged on a plurality of device levels (1, 2, 3, 4).

8. The method as claimed in claim 5, wherein some of the monitoring stations (9, 10, 11, 12) are arranged on one device level (1), and some are arranged on one or more further device levels.

9. The method as claimed in claim 5, wherein the monitoring stations (9, 10, 11, 12) are in a compact and/or modular form.

10. The method as claimed in claim 5, wherein the number of robots (7, 8) used is governed by the number of monitoring stations (9, 10, 11, 12 and/or by the occurrence of luggage items (14) to be expected.

11. The method as claimed in claim 5, wherein control of the robots (7, 8) which are used can be carried out with manual control from any of the optionally used monitoring stations (3), wherein one such monitoring station (3) in each case has all the necessary information available relating to the purposes of the other monitoring stations (3) with manual control.

12. The method as claimed in claim 5, wherein various types of emission protection (13) can be selected from a magazine, and can be fitted automatically to one or more of the robots (7, 8) which are present.

13. The method as claimed in claim 5, wherein the hazardous goods are luggage items.

14. A computer program having a program code for carrying out the method steps as claimed in claim 5 when the program is run in a computer.

15. A machine-legible carrier having the program code of a computer program for carrying out the method as claimed in claim 5 when the program is run in a computer.

16. The apparatus as claimed in claim 1, wherein the emission protection comprises two hemispherical shells.

17. The apparatus as claimed in claim 1 wherein the emission protection comprises radiation-repelling material.

18. The method as claimed in claim 5, wherein the emission protection comprises two hemispherical shells.

19. The method as claimed in claim 5, further comprising moving said emission protection (13) from said retracted position to the closed position if a good supported by said gripping apparatus is determined to be hazardous.

20. The method as claimed in claim 5, wherein the emission protection comprises radiation-repelling material.

* * * * *